(12) United States Patent
Horn et al.

(10) Patent No.: US 9,074,631 B2
(45) Date of Patent: Jul. 7, 2015

(54) MUTLI-PIECE ROLLING BEARING

(75) Inventors: Christian Horn, Bad Bocklet (DE); Marc-Andre Schaefer, Uechtelhausen (Zell) (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 115 days.

(21) Appl. No.: 13/994,261

(22) PCT Filed: Aug. 22, 2011

(86) PCT No.: PCT/EP2011/064383
§ 371 (c)(1),
(2), (4) Date: Jun. 14, 2013

(87) PCT Pub. No.: WO2012/079783
PCT Pub. Date: Jun. 21, 2012

(65) Prior Publication Data
US 2014/0126849 A1 May 8, 2014

(30) Foreign Application Priority Data
Dec. 17, 2010 (DE) .......................... 10 2010 054 902

(51) Int. Cl.
F16C 43/04 (2006.01)
F16C 33/37 (2006.01)
F16C 33/44 (2006.01)
F16C 19/40 (2006.01)
F16C 33/46 (2006.01)
F16C 19/54 (2006.01)

(52) U.S. Cl.
CPC ............. *F16C 33/4605* (2013.01); *F16C 19/54* (2013.01); *F16C 2326/02* (2013.01)

(58) Field of Classification Search
CPC .. F16C 33/4605; F16C 2226/50; F16C 19/54; F16C 2326/02
USPC ......... 384/510, 519, 520, 523, 526, 537, 539, 384/544, 551, 559, 560, 563, 564, 569, 572, 384/584, 589
See application file for complete search history.

(56) References Cited

U.S. PATENT DOCUMENTS 5,492,419 A 2/1996 Miller et al.
5,757,084 A 5/1998 Wagner
(Continued)

FOREIGN PATENT DOCUMENTS

CN 1262724 8/2000
CN 1954156 4/2007
(Continued)

*Primary Examiner* — Thomas R Hannon
*Assistant Examiner* — Adam D Rogers
(74) *Attorney, Agent, or Firm* — Davidson, Davidson & Kappel, LLC

(57) ABSTRACT

A wheel bearing arrangement with first rolling elements, which are capable of rolling on a first inner ring, wherein the rolling elements are guided by a first roller bearing cage, and an axial spacer element is provided for spacing apart the first inner ring from a bearing element, wherein the bearing element can in particular be a second inner ring. The intention is to facilitate the complex installation of the individual parts in wheel bearings for utility vehicles. The first rolling element cage forms, together with the axial spacer element, an axial form-fitting connection. The spacer element can be fixed to at least one of the inner rings via the form-fitting connection to the cage prior to tightening the wheel hub, together with the wheel bearing preinstalled thereon.

6 Claims, 2 Drawing Sheets

(56) References Cited

U.S. PATENT DOCUMENTS

| | | | |
|---|---|---|---|
| 6,149,244 A | 11/2000 | Wagner | |
| 6,386,764 B1* | 5/2002 | Moore et al. | 384/448 |
| 2003/0094849 A1 | 5/2003 | Joki et al. | |
| 2006/0204156 A1* | 9/2006 | Takehara et al. | 384/544 |

FOREIGN PATENT DOCUMENTS

| | | |
|---|---|---|
| DE | 2739739 A1 | 3/1979 |
| GB | 2004954 A | 4/1979 |
| WO | WO 0220284 A2 | 3/2002 |

* cited by examiner

MUTLI-PIECE ROLLING BEARING

The invention concerns a wheel bearing arrangement comprising first rolling elements that can roll on a first inner ring, said rolling elements being guided through a first rolling bearing cage, and further comprising an axial spacing element for spacing the first inner ring from a bearing element, which bearing element can particularly be a second inner ring.

BACKGROUND

U.S. Pat. No. 5,757,084 and U.S. Pat. No. 6,149,244 disclose wheel bearings for utility vehicles comprising two taper roller bearings. The inner rings of both the rolling element rows are spaced from each other through a bush-like spacing element possessing different outer diameters. In this way, the positions of the inner rings on the shaft journal are fixed whereby a pre-stress of the double row wheel bearing is established.

A problematic aspect of the solutions of the prior art is that installation as well as dismounting has to be assured with help of a retaining element that is used temporarily for the positioning of the spacing bushing. If not, the bushing would fall out and obstruct the introduction of the shaft journal into the wheel bearing. Moreover, during removal of the wheel bearing, the spacing bushing falls out between the inner rings because it cannot be retained from the outside. Therefore both a higher complexity of installation and a disadvantageous dismounting are accepted.

SUMMARY OF THE INVENTION

It is an object of the present invention to provide a wheel bearing unit that is cost-effective and easy to install and dismount.

The present invention provides a wheel bearing arrangement of the pre-cited type by the fact that the first rolling element cage forms a positive engagement with the axial spacing element. The axial spacing element can have an at least substantially hollow cylindrical configuration. Structurally, the axial spacing element should be suitable to bear against both inner rings, i.e. the spacing element comprises the axial surfaces required for this purpose, which axial surfaces can, for instance, have a ring-like or at least partially ring-like configuration.

Advantageously, the spacing element is configured as a bottomless bushing or sleeve that is cut, for example, in longitudinal direction of the axis of rotation to enable an elastic, radial matching to the shaft journal.

The wheel bearing arrangement of the invention comprises first rolling elements that can roll on a first inner ring, said rolling elements being guided through a first rolling bearing cage, and the axial spacing element being intended for spacing the first inner ring from a further bearing element, which bearing element is advantageously a second inner ring. Alternatively, it is also imaginable for the further bearing element to be a further spacing element.

Advantageously, the positive engagement can be realized through interlocking retaining elements. The retaining elements are configured on the first rolling bearing cage and on the axial spacing element and can have different shapes as required. One of the retaining elements may be configured as a hook, a retaining claw, as a tooth or with any similar shape in order to realize an optimal positive engagement with the respective interacting retaining element.

In one advantageous form of embodiment, the retaining element of the first rolling bearing cage is an end piece pointing substantially in a radially inward direction. The end piece can be continuous in peripheral direction or interrupted, and can have for instance a tooth-like configuration and be spaced in peripheral direction from a further tooth by a peripheral tooth gap.

In a further form of embodiment, the retaining element of the spacing element is an at least partially ring-like peripheral elevation. In this way, material is saved because the base body of the spacing element is also utilized for forming the retaining element. Through a cold forming of a spacing element made out of sheet metal, it is also possible to make a retaining element in a simple manner. This is particularly advantageous if the retaining element is shaped out of a non-hollow cylindrical part of the retaining element.

It is further advantageous if the elevation comprises a lead-in surface. In this way, an introduction aid is created that orients the spacing element concentrically to the rolling element cage. Moreover, the realization of the positive engagement is facilitated by the fact that the press-in force for establishing the positive engagement is optimally transmitted.

Alternatively, the elevation is elastically yielding and is subjected to elastic loading during the realization of the positive engagement. Thereafter, the elevation returns at least partially or completely into the initial position.

Advantageously, an end piece is movable during elastic loading of the elevation and, at a definable level of elastic loading, this end piece comes to abut against a stopper that limits the elastic loading. In this way, a plastic loading, i.e. damage to the spacing element can be prevented and the elastic loading can be controllably, i.e. optimally defined. Advantageously, the elastic loading can be defined through the choice of a determined amount of taper of the end piece or by a determined length of the end piece.

Advantageously, the elevation is configured as a hook, a tooth, a fold or a retaining claw. This can create advantages both for the manufacture of the spacing element as also for the installation of the wheel bearing. Alternatively, the elevation may comprise an end piece that is configured as a hook, a tooth, a fold or a retaining claw.

Advantageously, the bearing element is a second inner ring on which rolling elements guided in a second rolling element cage roll, this second rolling element cage likewise forming a positive engagement with the axial spacing element. For implementing the invention only one positive engagement with the first inner ring is necessary. Through this measure, the spacing element is optimally positioned but, with a completely installed rolling bearing, it must be possible to transmit an axial force from the spacing element to the second inner ring at least indirectly or even directly. A positive engagement of the spacing element with the first and the second inner ring offers the advantage that the wheel bearing can be pre-installed on the wheel hub and must then only be slipped onto the shaft journal and be subsequently screwed to the shaft journal.

Further advantageous features and preferred developments of the invention become obvious from the description of the figures and/or the dependent claims.

BRIEF DESCRIPTION OF THE DRAWINGS

The invention will now be described and explained more closely with reference to examples of embodiment illustrated in the appended figures.

DETAILED DESCRIPTION

Figure 1:
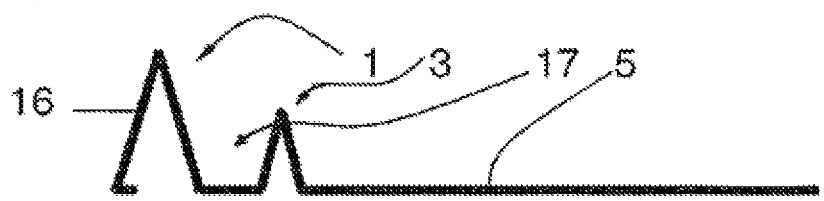
FIG. 1 shows an axial end of a spacing element that is cut in longitudinal direction and configured as a sleeve.

FIG. 1 shows an axial end of a sleeve 5 that is cut in a longitudinal direction and is intended to space two inner rings, not shown, of a wheel bearing and thus constitutes a spacing element of the invention. The elevations 1 and 3 extend in peripheral direction and, if need be, they can be interrupted by gaps. What is decisive is that a radial annular space 17 is formed between the elevations 1 and 3 that can receive a part of a rolling bearing cage. In this way, an axial positive engagement is formed between the cage, not shown, and the sleeve 5.

In order to at all enable the formation of the positive engagement, the sleeve 5 can be made, for instance, out of sheet metal or out of another stable material, and the cage can possess a certain degree of elasticity. This enables the cage to be pushed over the elevation 1 into the annular space 17. The elasticity of the cage must be chosen such that on the one hand, in their snapped-in state, the inner ring and the bushing 5 form an installable assembly.

Alternatively, the elevation 1 and the rolling bearing cage are interrupted in peripheral direction by gaps such that the elevation 1 and the rolling bearing cage can be connected to each other after the manner of a bayonet catch and thus create the axial positive engagement. For this purpose, the rolling bearing cage and the sleeve are brought together in axial direction so that the gaps of the end piece of the rolling bearing cage pass by respective elevations 1 that are likewise interrupted by gaps, and thus form the axial positive engagement through a turn around the axis of rotation.

In both alternatives, the elevation 1 prevents the rolling bearing cage from being pushed further in axial direction. When the rolling bearing cage comes to be situated in the annular space 17, the dimension of the axial clearance can be fixed through the spacing of the two elevations 1 and 3. In the absence of clearance, a clamping between the elevations 1, 3 is created, and the rolling bearing cage can freewheel, for instance, through a corresponding initial abrasion of material when the rolling bearing is set into operation.

Figure 2:
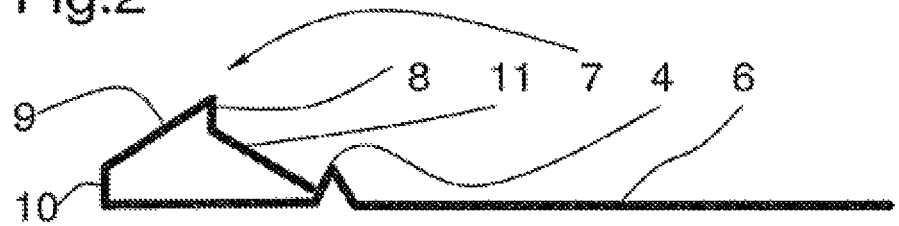
FIG. 2 shows an axial end of a spacing element that is cut in longitudinal direction, configured as a sleeve and comprises a snapping element.

FIG. 2 shows the axial end of a spacing element that is configured as a longitudinally cut sleeve 6, said sleeve 6 comprising an elastically loadable snapping element 7. The snapping element 7 facilitates the positive engagement connection between the rolling bearing cage and the sleeve 6 by the fact that it comprises a conical ramp that, during an axial approaching movement towards the rolling bearing cage, guides the rolling bearing cage while being pressed together in radial direction. This leads to an elastic loading of the radially extending region 10 and enables the radial snapping-back of the conical lead-in surface 9 from the elastically loaded position into the elastically non loaded starting position.

After the snapping-back, the positive engagement is created by the axial surface 8 that bears against the end piece of the rolling bearing cage, not shown, because the axial surface 8 can no longer be moved back in the opposite axial direction once the snapping element 7 has snapped in. The length of the conical end piece 11 following the axial surface 8 fixes a defined distance from the stopper 4 that limits the maximum elastic loading of the radially extending region 10. The larger the chosen distance from the stopper 4, the higher is the elastic loading. In particular, the stopper 4 can also prevent a plastic deformation of the snapping element 7 or even assume the function of a spring to achieve a desired pre-stress range. The maximum elastic loading can then be defined dependent on the axial end side inner diameter of the rolling bearing cage. Thus the rolling bearing cage can likewise be made out of a rigid or stable material, for instance metal, that needs to be loaded neither elastically nor plastically.

Figure 3:
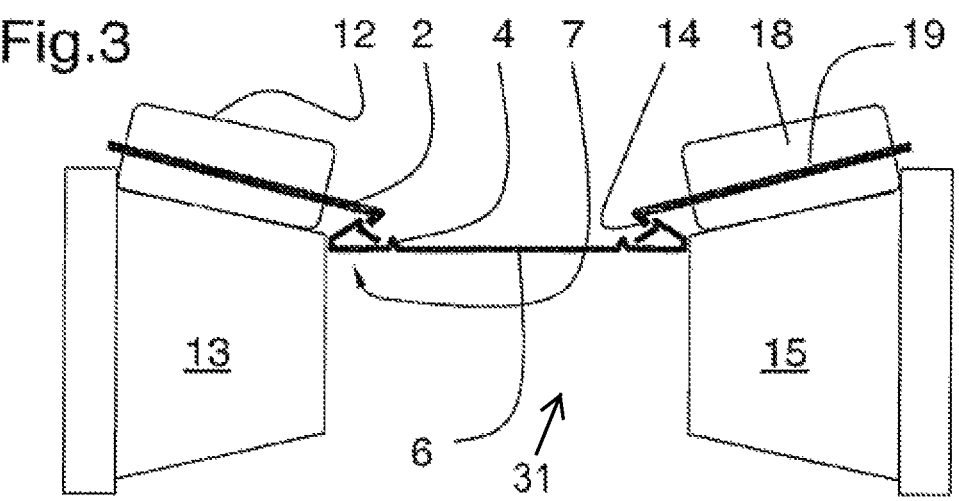
FIG. 3 shows a wheel bearing comprising a spacing element connected on both ends, without outer rings.

FIG. 3 shows the rolling element rows comprising tapered rollers 12, 18 and their cages 2, 19 which, together with the inner rings 13, 15, form a wheel bearing module that is retained together through the snapping elements 7 of the sleeve 6. Installation is enormously facilitated by the fact that the inner rings 13, 15 take an exactly defined position relative to each other. Moreover, the module also does not fall apart during maintenance work but remains as it is. This also enables a broader supporting base so that the rigidity of the entire wheel bearing is improved. Advantageously, the manufacturing costs of a wheel bearing on the basis of said module are lower than those of a comparable insert bearing.

Figure 4:
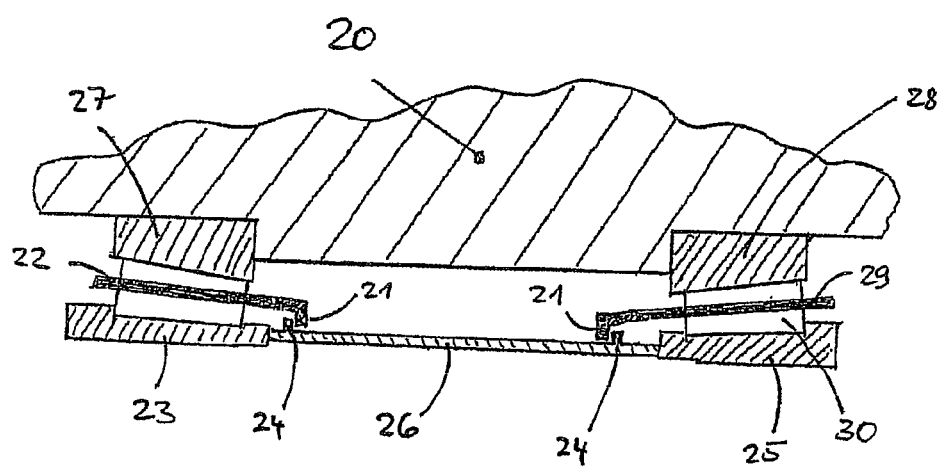
FIG. 4 shows a wheel bearing module pre-installed on a cast hub.

FIG. 4 shows a wheel hub 29 made out of cast iron and comprising a wheel bearing module made up of two outer rings 27, 28, two cages 22, 29, two inner rings 23, 25 and a spacing bushing 26. The spacing bushing 26 comprises radial extensions 24 configured as end pieces that start from a fractional cylindrical part of the sleeve 26 and are oriented radially outwards in direction of the wheel hub 20. Together with a radial end piece 21 of the cage 22 and of the cage 29, the radial extensions 24 create the required axial positive engagement. Because the two outer rings 27, 28 abut in axially opposed directions against the wheel hub 20, and the inner rings 23, 25 held by the sleeve 26 through the cages 22, 29 in their turn hold the outer rings 27, 28 through the rolling elements in axial direction, the module can be pre-installed on the wheel hub 20 for being slipped as a whole onto the shaft journal, not shown. Advantageously, the sleeve does not need to be held through complex measures during the installation.

Whereas the sleeves of FIGS. 1 to 3 are made by shaping out of sheet metal, the sleeve 26 can be made by turning, sintering or deep drawing.

To sum up, the invention concerns a wheel bearing arrangement comprising first rolling elements that can roll on a first inner ring, said rolling elements being guided through a first rolling bearing cage, and further comprising an axial spacing element for spacing the first inner ring from a bearing element, which bearing element can particularly be a second inner ring. The invention intends to simplify the complex installation of the individual parts in wheel bearings for utility vehicles. For this purpose, the first rolling bearing cage forms together with the axial spacing element an axial positive engagement. Further, a number of methods are given for realizing this positive engagement in a simple manner. This makes it possible for the spacing element to be fixed through the positive engagement with the cage on at least one of the inner rings prior to mounting of the wheel hub together with the wheel bearing which is pre-installed thereon. A retaining element for a temporary retention during installation is not required, and the wheel bearing does not fall apart even during dismounting.

LIST OF REFERENCE NUMERALS

| | | | |
|---|---|---|---|
| 1 | Elevation | 2 | Rolling bearing cage |
| 3 | Elevation | 4 | Stopper |
| 5 | Sleeve (spacing element) | 6 | Sleeve (spacing element) |
| 7 | Elevation | 8 | Axial surface |
| 9 | Lead-in surface | 10 | radially extending region |
| 11 | End piece | 12 | Rolling elements |
| 13 | Inner ring | 14 | Retaining element |
| 15 | Inner ring | 16 | Lead-in surface |
| 17 | Annular space | 18 | Rolling elements |

LIST OF REFERENCE NUMERALS

| | | | |
|---|---|---|---|
| 19 | Rolling bearing cage | 20 | Cast hub |
| 21 | Retaining element | 22 | Rolling bearing cage |
| 23 | Inner ring | 24 | Radial extensions |
| 25 | Inner ring | 26 | Sleeve |
| 27 | Outer ring | 28 | Outer ring |
| 29 | Rolling bearing cage | 30 | Rolling elements |

What is claimed is:

1. A wheel bearing arrangement comprising:
first rolling elements rollable on a first inner ring, the first rolling elements being guided through a first rolling bearing cage; and
an axial spacing element for spacing the first inner ring from a bearing element, the first rolling bearing cage forming a positive engagement with the axial spacing element;
wherein the positive engagement is formed by interlocking retaining elements;
wherein one of the interlocking retaining elements is a retaining element of the axial spacing element, the retaining element is an at least partially annular peripheral elevation;
wherein the elevation comprises a lead-in surface;
wherein the elevation yields elastically;
wherein an at least one end piece is movable during elastic loading of the elevation and at a definable elastic loading, the end piece coming to abut against a stopper limiting the elastic loading.

2. The wheel bearing arrangement as recited in claim 1 wherein the axial spacing element is a sleeve.

3. The wheel bearing arrangement as recited in claim 1 wherein one of the interlocking retaining elements is a bearing cage retaining element of the first rolling bearing cage, the bearing cage retaining element being an end piece pointing in a radially inward direction.

4. The wheel bearing arrangement as recited in claim 1 wherein the elastic loading can be defined by a determined amount of taper of the at least one end piece or by a determined length of the at least one end piece.

5. The wheel bearing arrangement as recited in claim 1 wherein the elevation is configured as a hook or a retaining claw.

6. The wheel bearing arrangement as recited in claim 1 wherein the bearing element is a second inner ring on which further rolling elements guided through a second rolling bearing cage roll, the second rolling bearing cage also forming a positive engagement with the axial spacing element.

* * * * *